(12) United States Patent
Boland (10) Patent No.: US 8,499,408 B2
(45) Date of Patent: Aug. 6, 2013

(54) WINDSHIELD WIPER DEVICE

(71) Applicant: Federal-Mogul S.A., Aubange (BE)

(72) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 0 days.

(21) Appl. No.: 13/759,883

(22) Filed: Feb. 5, 2013

(65) Prior Publication Data

US 2013/0145569 A1 Jun. 13, 2013

Related U.S. Application Data (63) Continuation of application No. 12/307,651, filed as application No. PCT/EP2007/056646 on Jul. 2, 2007, now abandoned.

(30) Foreign Application Priority Data

Jul. 6, 2006 (EP) ..................................... 06116695

(51) Int. Cl.
 *B60S 1/40* (2006.01)
(52) U.S. Cl.
 USPC ................. 15/250.32; 15/250.43; 15/250.351

(58) Field of Classification Search
 USPC ............. 15/250.32, 250.33, 250.351, 250.43, 15/250.44, 250.201, 250.361
 See application file for complete search history.

(56) References Cited

FOREIGN PATENT DOCUMENTS

| DE | 10228494 | * | 1/2004 |
|---|---|---|---|
| DE | 20314551 | * | 1/2005 |
| DE | 10340139 | * | 3/2005 |
| EP | 1681216 | * | 7/2006 |
| WO | WO03/084789 | * | 10/2003 |

* cited by examiner

*Primary Examiner* — Gary Graham
(74) *Attorney, Agent, or Firm* — Robert L. Stearns; Dickinson Wright, PLLC (57) ABSTRACT

A windscreen wiper device comprising an elastic, elongated carrier element, as well as an elongated wiper blade of a flexible material, a connecting device pivotally connected to the connecting device about a pivot axis near one end. The connecting device comprises at least a first part and a second part and first and second retaining means for retaining the connecting device onto the oscillating arm. The first retaining means comprises at least one first protrusion on the second part engaging in a correspondingly shaped hole provided in the oscillating arm, and wherein the second retaining means comprise at least one second protrusion provided on the first part engaging the oscillating arm.

7 Claims, 7 Drawing Sheets

WINDSHIELD WIPER DEVICE

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of the longitudinal strips are interconnected by a respective connecting piece, which windscreen wiper device comprises a connecting device for an oscillating arm, wherein the oscillating arm is pivotally connected to the connecting device about a pivot axis near one end.

2. Related Art

Such a windscreen wiper device is generally known. This prior art windscreen wiper device is designed as a "yokeless" wiper device, wherein no use is made of several yokes pivotally connected to each other, but wherein the wiper blade is biased by the carrier element, as a result of which it exhibits a specific curvature.

In practice it has become apparent that, during use of the known windscreen wiper device, high forces are exerted on the connection between the connecting device and the oscillating arm. As a consequence thereof the wiper blade may get loose from the oscillating arm.

SUMMARY OF THE INVENTION

The object of the invention is to provide a windscreen wiper device, wherein the connecting device and the oscillating arm are connected in an improved manner, using a minimum of parts.

Thereto, a windscreen wiper device of the type referred to in the introduction is characterized according to the invention in that the connecting device comprises at least two parts provided with protrusion/hole means for detachably connecting the parts together, wherein the first part is retained onto the wiper blade and wherein the second part has an at least substantially U-shaped cross-section at the location of its connection to the first part, wherein the windscreen wiper device is provided with first and second retaining means for retaining the connecting device onto the oscillating arm, wherein the first retaining means comprises at least one first protrusion on the second part engaging in a correspondingly shaped hole provided in the oscillating arm, and wherein the second retaining means comprise at least one second protrusion provided on the first part engaging the oscillating arm. Particularly, the first protrusion engages into a correspondingly shaped hole with a closed circumference provided on the oscillating arm. More in particular, the first protrusion engages into a correspondingly shaped hole with an open circumference provided on a longitudinal side of the oscillating arm. Even more in particular, the first protrusion engages into a correspondingly shaped recess provided on the oscillating arm.

Preferably, the first protrusion is designed as a resilient tongue snappingly engaging into the correspondingly shaped hole of the oscillating arm. In that case, the first protrusion is movable along a hinge axis between a first position retaining the oscillating arm onto the connecting device and a second position releasing the oscillating arm from the connecting device. The hinge axis is facing towards the free end of the oscillating arm or is facing away from the free end of the oscillating arm, all relative to the resilient tongue.

It is noted that the present invention is not restricted to the use of two longitudinal strips forming the elastic, elongated carrier element. Instead, the carrier element may comprise only one longitudinal strip, that is particularly located in a central channel of the wiper blade. In one preferred embodiment of a windscreen wiper device in accordance with the invention the second protrusion engages into a correspondingly shaped hole with a closed circumference provided on the oscillating arm. In the alternative, the second protrusion engages into a correspondingly shaped hole with an open circumference provided on a longitudinal side of the oscillating arm.

In another preferred embodiment of a windscreen wiper device according to the invention the second protrusion engages into a correspondingly shaped recess provided on the oscillating arm.

In another preferred embodiment of a windscreen wiper device in accordance with the invention the first protrusion extends downwardly from a base of the U-shaped cross-section of the second part.

In another preferred embodiment of a windscreen wiper device according to the invention the second protrusion extends upwardly from the first part.

In another preferred embodiment of a windscreen wiper device in accordance with the invention the first part is positioned at least substantially within the second part.

In another preferred embodiment of a windscreen wiper device according to the invention the first part comprises engaging members made integral therewith for engaging around the longitudinal sides of the longitudinal strips that face away from each other. In other words, the engaging members each form a groove for introducing the longitudinal strips therein, so that the first part of the connecting device is firmly retained onto the wiper blade. In order to enhance the retention thereof the engaging members may be welded, soldered, brazed or glued to the longitudinal strips.

BRIEF DESCRIPTION OF THE DRAWINGS

The invention will now be explained in more detail with reference to figures illustrated in a drawing, wherein FIGS. 1A, 1B, 2A, 2B, 2C show various successive steps for fitting together a connecting device and an oscillating arm of a windscreen wiper device according to the invention, wherein FIGS. 1A, 1B are a schematic, perspective view and wherein FIGS. 2A, 2B, 2C are a side view;

FIGS. 5A through 7B correspond to FIGS. 1A through 4C, but now relating to a second embodiment of a windscreen wiper device in accordance with the invention.

DETAILED DESCRIPTION

Figure 1A:
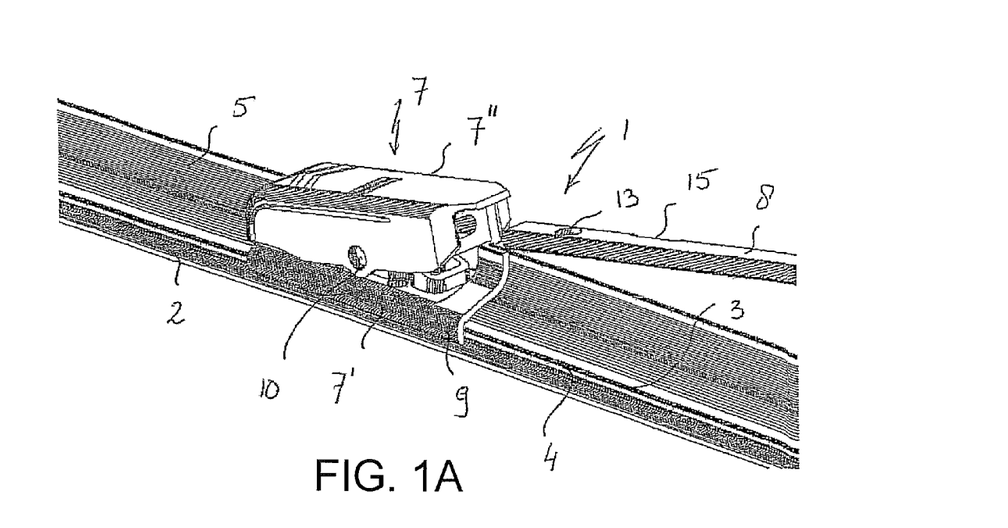
Figure 1B:
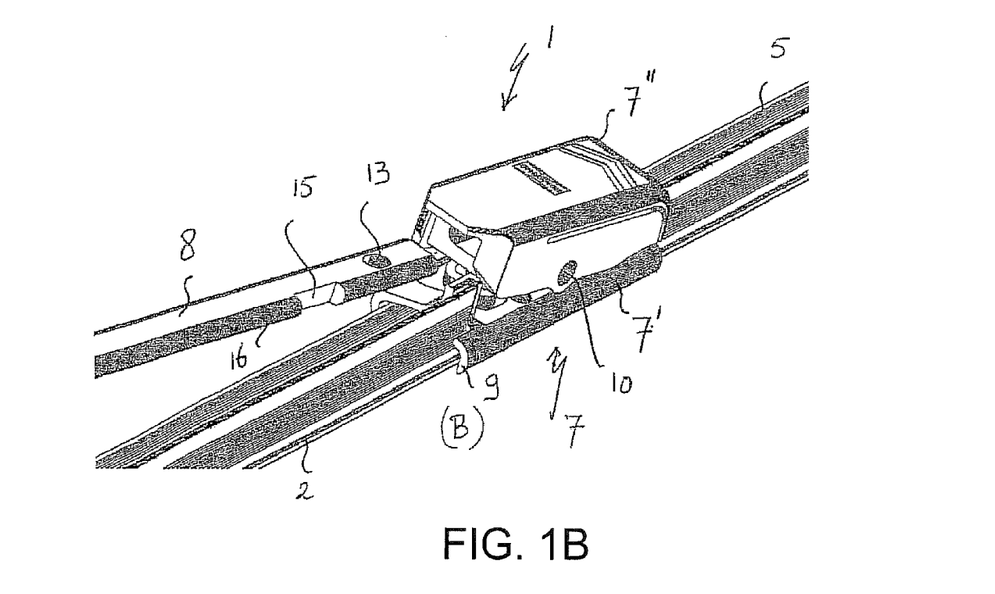

FIGS. 1A, 1B show a windscreen wiper device 1 of the "yokeless" type according to the invention. The windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the rubber wiper blade 2, as it were, which is thus biased in a curved position (the curvature in operative position being that of a windscreen to be wiped). Neighboring ends of strips 4 are interconnected on either side of the windscreen wiper device 1 by means of connecting pieces functioning as clamping members. In this embodiment, the connecting pieces are separate constructional elements, which may be form-locked ("positive locking" or "having positive fit") as well as force-locked to the ends of strips 4. In another preferred variant, the connecting pieces are in one piece with the strips 4 made of spring band steel. In the latter case the connecting pieces form transverse bridges for the strips 4, as it were. Possibly, a spoiler 5 is furthermore provided.

The windscreen wiper device 1 is furthermore built up of a connecting device 7 of plastic material for an oscillating wiper arm 8. The wiper arm 8 is finalized by an extension (without an adapter). Connecting device 7 consists of a first part 7' and a second part 7" detachably connected together. The first part 7' is retained onto the wiper blade 2 and is positioned within the second part 7". Further, the first part 7' comprises clamping members 9 that are integral therewith, which engage round longitudinal sides of the strips 4 that face away from each other, as a result of which the connecting device 7 is firmly attached to the unit consisting of wiper blade 2 and strips 4. The second part 7" has a U-shaped cross-section at the location of its connection to the first part 7'. The oscillating wiper arm 8 is pivotally connected to the connecting device 7 about a pivot axis near one end, and that in the following manner.

With reference to FIGS. 1A through 2C the first part 7¹ comprises two cylindrical protrusions 10 extending outwards on either side of the second part 7'. These protrusions 10 pivotally engage in identically shaped cylindrical holes 11 of the second part 7". the protrusions 10 act as bearing surfaces at the location of a pivot axis in order to pivot the second part 7" (and the oscillating wiper arm 8 attached thereto} about the pivot axis near one end of the arm 8. The protrusions 10 are preferably in one piece with the first part 7'; in the alternative, the protrusions 10 are part of a single pivot pin perpendicular to the connecting device 7.

Figure 4A:
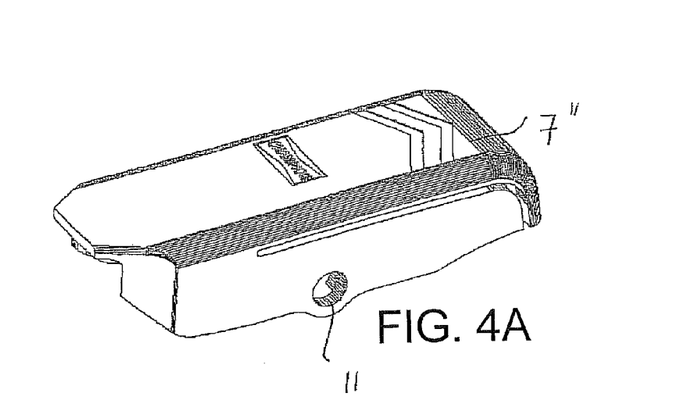
FIGS. 4A, 4B, 4C refer to a perspective, schematic view of a second part of the connecting device of FIGS. 1A, 1B.
Figure 4B:
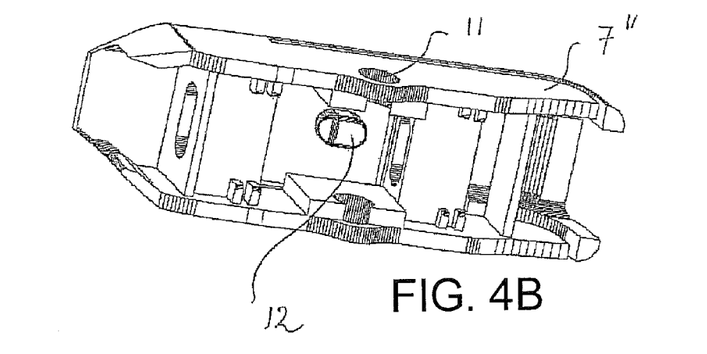
Figure 4C:
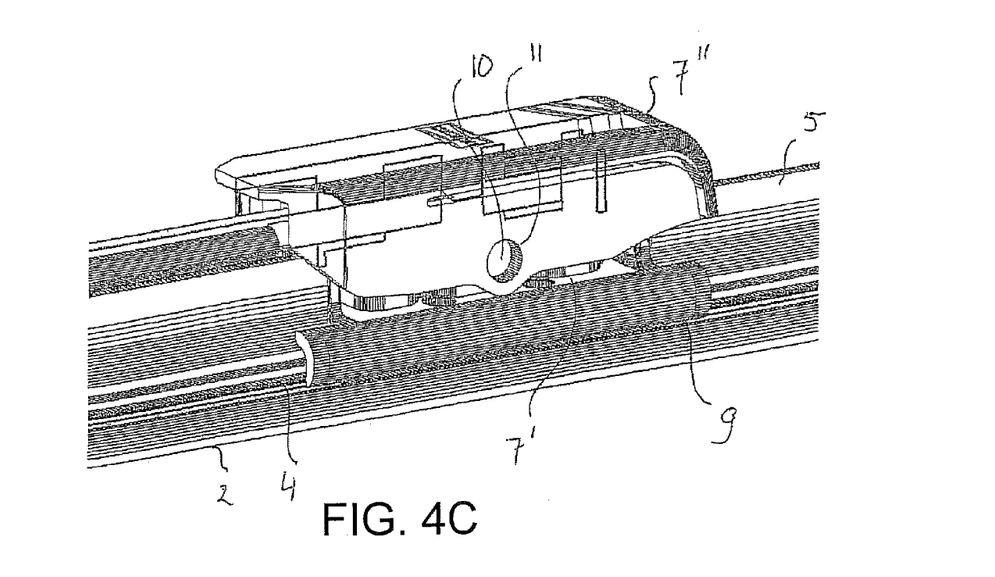

Referring to FIGS. 3A through 4C, the second part 7" comprises a protrusion 12 extending downwardly from a base of the U-shaped cross-section of the second part 7", while the oscillating arm 8 has an identically shaped hole 13 with a closed circumference at the location of its connection to the second part 7", so that the protrusion 12 engages in the hole 13 (FIG. 4C). The interconnection between the second part 7" and the oscillating arm 8 is done through a snapping operation, that is clipping the protrusion 12 into the hole 13.

The protrusion 12 on the second part 7" and the hole 13 in the oscillating arm 8 are meant for retaining the connecting device 7 onto the oscillating arm 8 and are therefore called "first retaining means". However, in case the first retaining means would dysfunction, for example when the protrusion 12 would not properly fit into the hole 13, the second part 7" and the first part 7' connected thereto would be able to move relative to the oscillating arm 8 in longitudinal direction of the wiper blade 2. In order to avoid the wiper blade 2 from coming loose, with all negative consequences involved, second retaining means are provided for. the second retaining means consist of an upwardly extending protrusion 14 on the first part 7' cooperating with a second hole 15 having a open circumference in the oscillating arm 8. In other words, the protrusion 14 engages into the correspondingly shaped hole 15 with an open circumference provided on a longitudinal side 16 of the oscillating arm 8. the protrusion 14 may also be called a cam.

FIGS. 5A through 7B refer to another preferred embodiment, wherein alternative second retaining means are shown in the sense that the first part 7' comprises an upwardly extending protrusion or cam 16 cooperating with a second hole 17 having a closed circumference in the oscillating arm 8. In other words, the protrusion 16 engages into the correspondingly shaped hole 17 with a closed circumference.

Figure 2A:
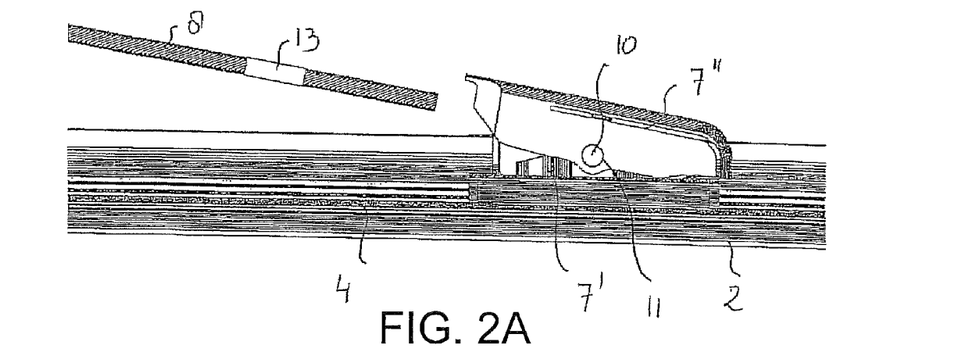
Figure 2B:
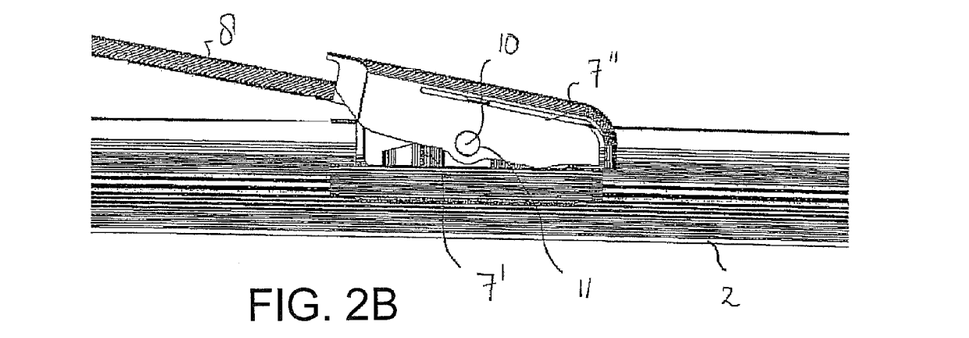
Figure 2C:
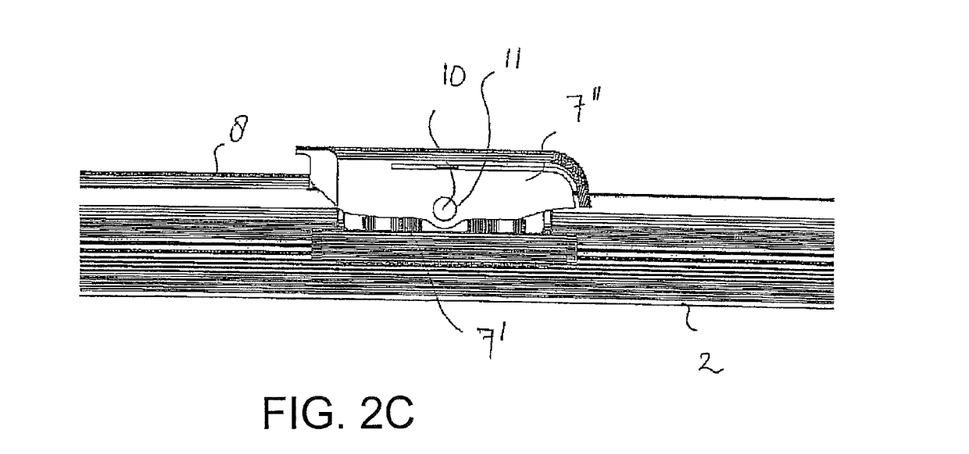
Figure 3A:
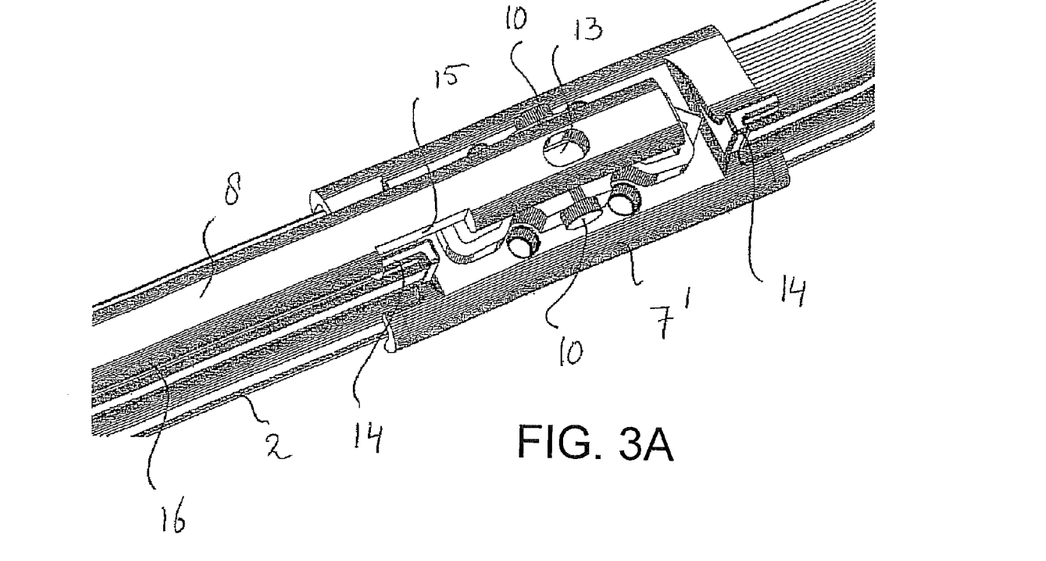
FIGS. 3A, 3B are a perspective, schematic view of the oscillating arm of FIGS. 1A, 1B connected to a first part of the connecting device of FIGS. 1A, 1B.
Figure 3B:
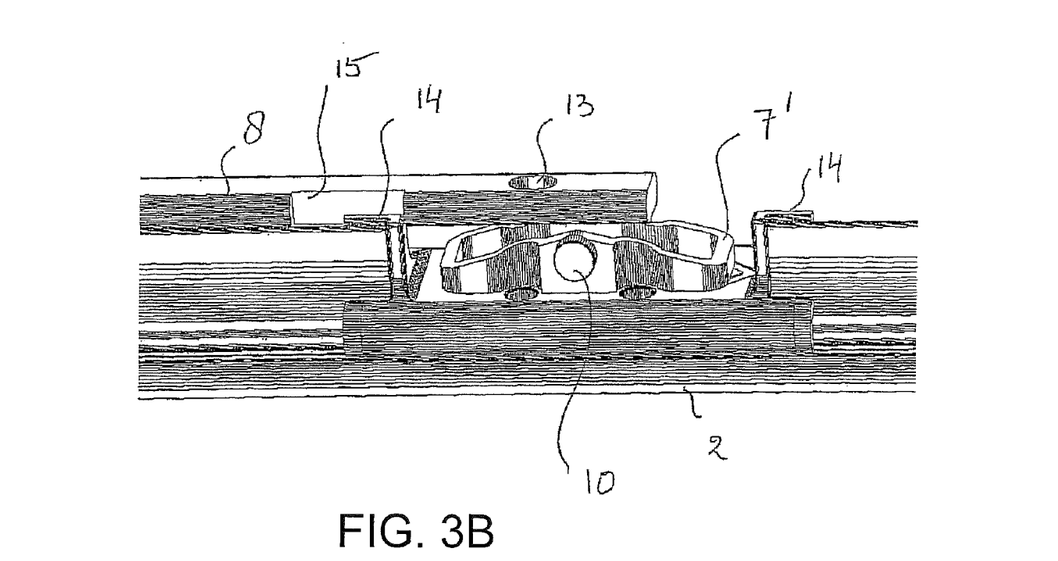

For mounting or dismounting the connecting device 7 onto or from the oscillating arm 8, the second part 7" and thus the free end of the oscillating arm 8 connected thereto is pivoted relative to the first part 7¹ (FIGS. 2A through 2C). While carrying out the pivot movement the protrusion or cam 14,16 is no longer in line with the hole 13,17 and cannot mutually cooperate any longer, so that the second part 7" and the first part 7' attached thereto can be released from the oscillating arm 8. This can, of course, only be done when also the protrusion 12 in all embodiments is released from the hole 13.

Figure 5A:
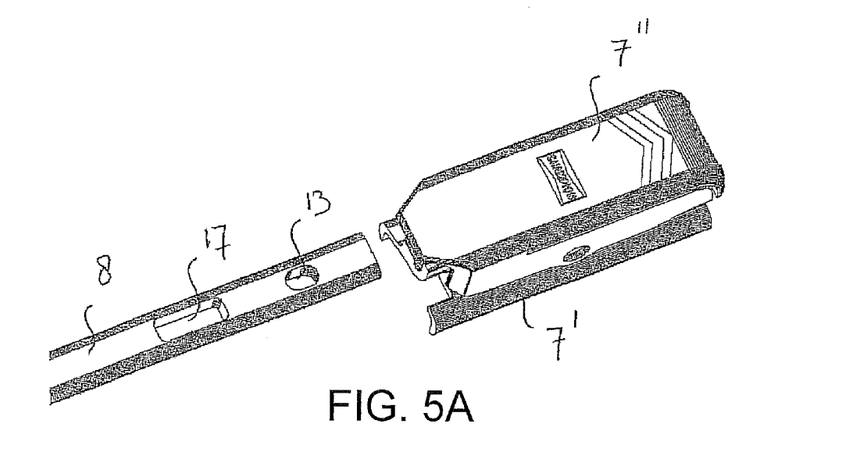
Figure 5B:
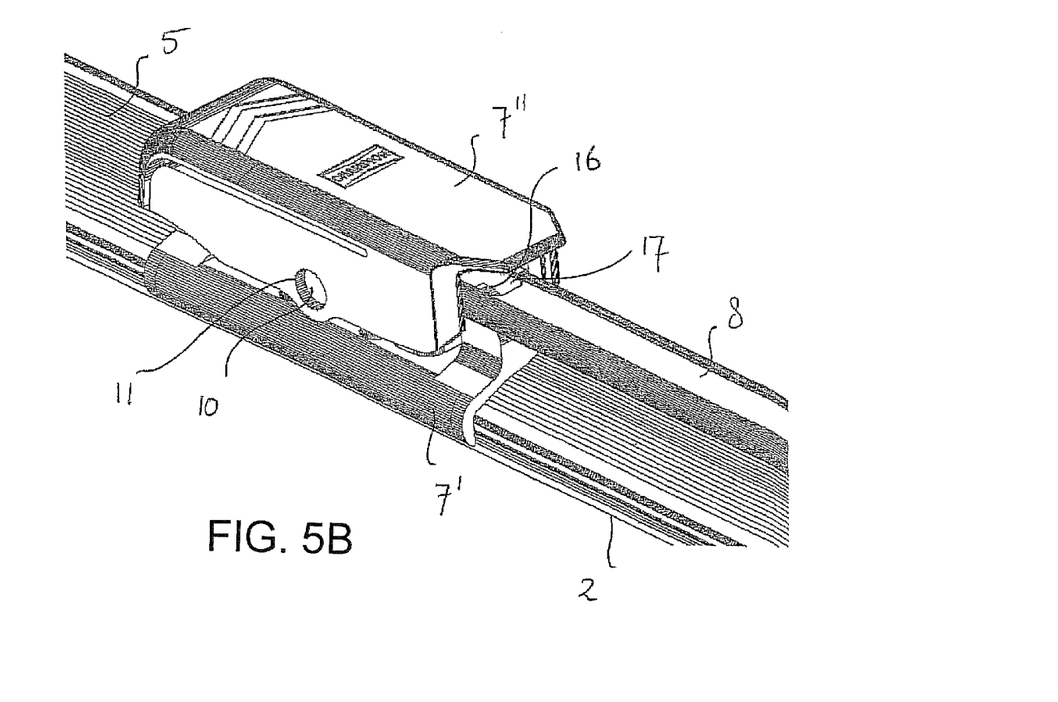
Figure 6A:
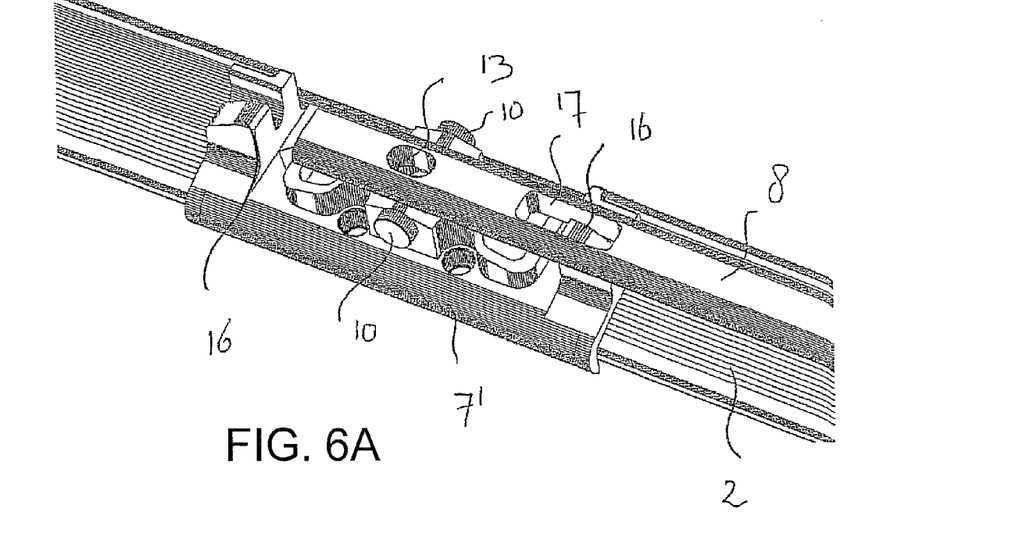
Figure 6B:
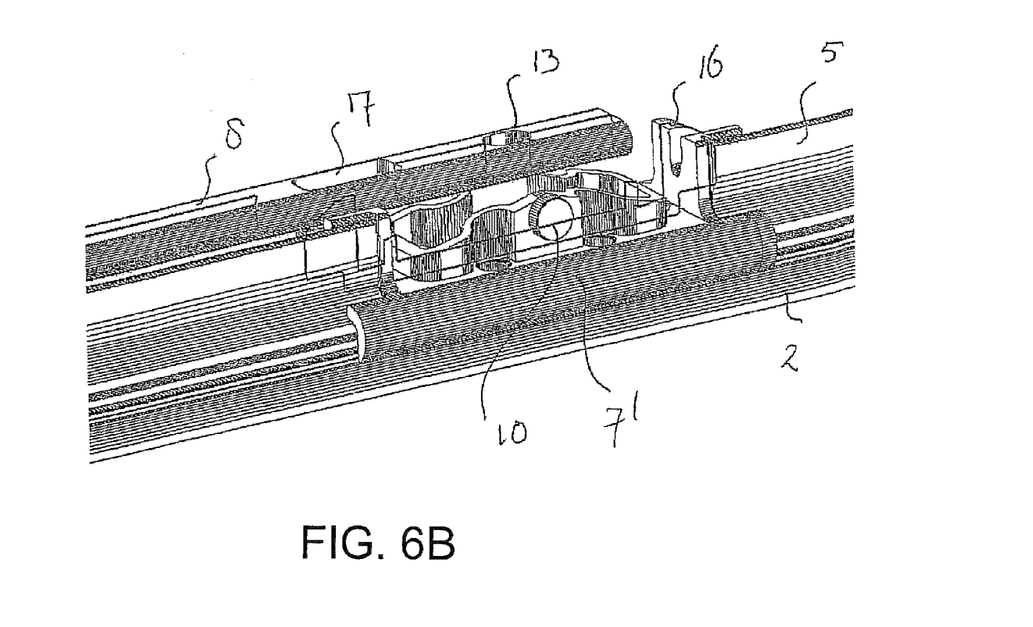
Figure 7A:
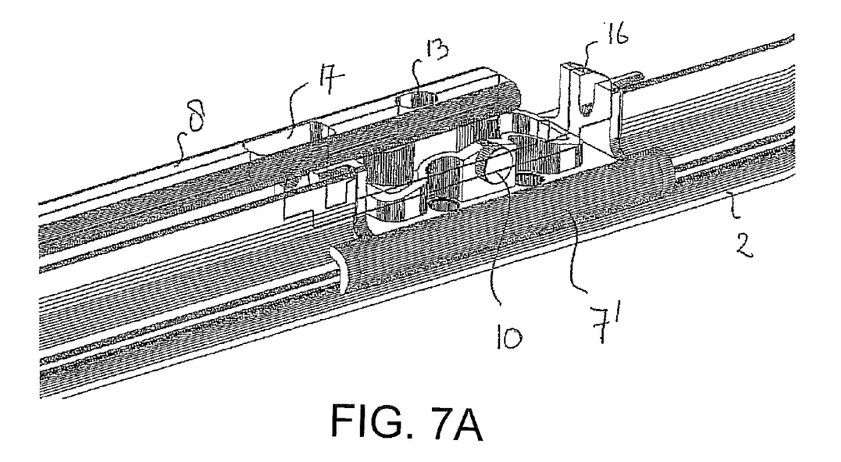
Figure 7B:
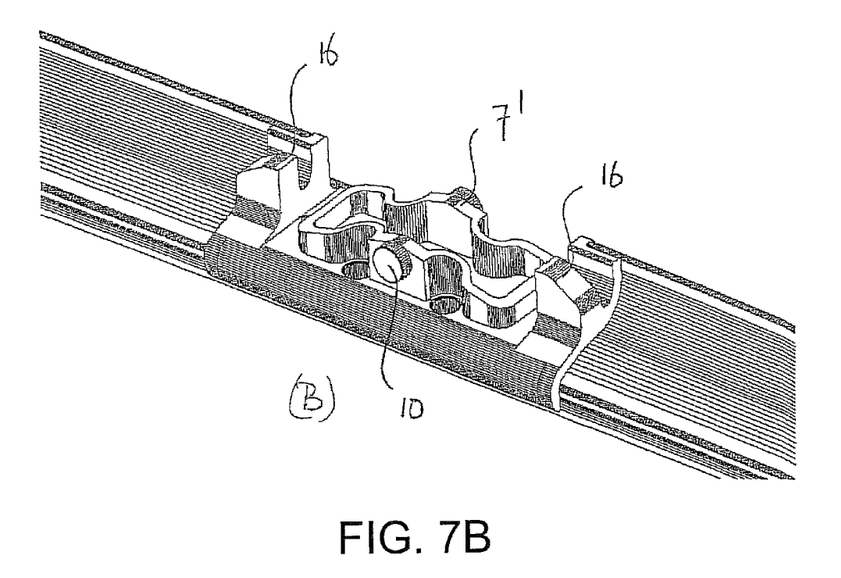

It is noted that the first part 7' according to the first embodiment of FIGS. 1A through 4C and the first part 7' according to the second embodiment of FIGS. 5 through 7 are mirror symmerical along a mid cross-sectional plane through the first parts 7'. Therefore, the second part 7" can be clipped onto the first part 7' irrespective of the orientation in longitudinal direction of the second part 7" relative to the first part 7'. Further, it is noted that both embodiments differ as far as the first part 7' is concerned, whereas the second part 7" with the downwardly extending protrusion 12 engaging into the correspondingly shaped hole 13 in the oscillating arm 8 is the same in both embodiments.

The invention is not restricted to the variants shown in the drawing, but it also extends to other embodiments that fall within the scope of protection. For example, a skilled person would easily recognize that instead of the hole 15, 17 with an open or closed circumference, also a recess provided on the oscillating arm 8 could be used. Also, as already mentioned, a skilled person would easily understand that the present invention is not necessarily restricted to the use of two longitudinal strips, but may also be applied to only one longitudinal strip, which is preferably inserted in a central channel in the wiper blade.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, which windscreen wiper device comprises a connecting device for an oscillating arm, wherein said oscillating arm is pivotally connected to said connecting device about a pivot axis near one end, wherein said connecting device comprises at least two parts provided with protrusion/ hole means for detachably connecting said parts together, wherein the first part is retained onto the wiper blade and wherein the second part has an at least substantially U-shaped cross-section at the location of its connection to said first part, wherein said windscreen wiper device is provided with first and second retaining means for retaining said connecting device onto said oscillating arm, wherein said first retaining means comprises at least one first protrusion on the second part engaging in a correspondingly shaped hole provided in said oscillating arm, and wherein said second retaining means comprise at least one second protrusion provided on the first part engaging the oscillating arm, wherein said first part is positioned at least substantially within said second part and that said second protrusion engages into a correspondingly shaped hole with a closed circumference provided on the oscillating arm or into a correspondingly shaped hole with an open circumference provided on a longitudinal side of the oscillating arm or into a correspondingly shaped recess provided on the oscillating arm.

2. A windscreen wiper device according to claim 1, wherein said first protrusion engages into a correspondingly shaped hole with a closed circumference provided on the oscillating arm.

3. A windscreen wiper device according to claim 1, wherein said first protrusion engages into a correspondingly shaped hole with an open circumference provided on a longitudinal side of the oscillating arm.

4. A windscreen wiper device according to claim 1, wherein said first protrusion engages into a correspondingly shaped recess provided on the oscillating arm.

5. A windscreen wiper device according to claim 1, wherein said first protrusion extends downwardly from a base of the U-shaped cross-section of said second part.

6. A windscreen wiper device according to claim 1, wherein said second protrusion extends upwardly from said first part.

7. A windscreen wiper device according to claim 1, wherein said first part comprises engaging members made integral therewith for engaging around the longitudinal sides of the longitudinal strips that face away from each other.

* * * * *